(12) United States Patent
Lo et al.

(10) Patent No.: US 11,287,663 B2
(45) Date of Patent: Mar. 29, 2022

(54) OPTICAL TRANSMITTING MODULE AND HEAD MOUNTED DISPLAY DEVICE

(71) Applicant: Coretronic Corporation, Hsin-Chu (TW)

(72) Inventors: Yi-Chien Lo, Hsin-Chu (TW); Hung-Ta Chien, Hsin-Chu (TW); Hsin-Hsiang Lo, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 292 days.

(21) Appl. No.: 16/656,578

(22) Filed: Oct. 18, 2019

(65) Prior Publication Data
US 2020/0124853 A1 Apr. 23, 2020

(30) Foreign Application Priority Data
Oct. 18, 2018 (CN) .......................... 201811213344.5

(51) Int. Cl.
*G02B 27/14* (2006.01)
*F21V 8/00* (2006.01)
(Continued)

(52) U.S. Cl.
CPC .............. *G02B 27/14* (2013.01); *G02B 6/005* (2013.01); *G02B 6/0015* (2013.01);
(Continued)

(58) Field of Classification Search
CPC .............. G02B 27/0172; G02B 27/288; G02B 27/0081; G02B 27/0176; G02B 27/4261;
(Continued)

(56) References Cited

U.S. PATENT DOCUMENTS 6,829,095 B2 12/2004 Amitai
7,576,916 B2 8/2009 Amitai
(Continued)

FOREIGN PATENT DOCUMENTS

CN 1867853 11/2006
CN 102445756 5/2012
(Continued)

OTHER PUBLICATIONS

"Office Action of China Counterpart Application", dated May 21, 2021, p. 1-p. 8.
(Continued)

*Primary Examiner* — Darryl J Collins
*Assistant Examiner* — Tamara Y. Washington
(74) *Attorney, Agent, or Firm* — JCIPRNET

(57) ABSTRACT

An optical transmitting module and a head mounted display device are provided. The optical transmitting module includes a waveguide and a first lens. The waveguide is located on a transmission path of an image beam. The waveguide includes a plurality of beam splitters configured to split the image beam the image beam into a first image beam and a second image beam. The second image beam reflected by the beam splitter is outputted from the waveguide, so as to display a virtual image. The first lens causes a plurality of virtual images displayed by a plurality of the second image beams reflected from different beam splitters at the same angle to coincide on a focal plane of the first lens. The head mounted display device can eliminate a ghost image phenomenon that occurs when the user observes the images displayed in a range closer to the eye.

17 Claims, 9 Drawing Sheets

(51) Int. Cl.
*G02B 27/28* (2006.01)
*G02B 27/01* (2006.01)

(52) U.S. Cl.
CPC ......... *G02B 6/0035* (2013.01); *G02B 27/288* (2013.01); *G02B 27/0172* (2013.01); *G02B 2027/011* (2013.01)

(58) Field of Classification Search
CPC ............ G02B 27/4272; G02B 27/0955; G02B 27/4205; G02B 27/017; G02B 27/01; G02B 27/0101; G02B 6/0015; G02B 6/0035; G02B 6/005; G02B 2027/0127; G02B 2027/0185; G02B 2027/011; G02B 2027/0178; G02B 2027/0154; G02B 2027/0174; G02B 2027/0123; G02B 2027/014; G02B 3/14; G02B 5/3025; G02B 6/0013; G02B 6/0033; G02B 27/14; G02F 1/29; G02F 1/294; G06T 11/00

See application file for complete search history.

(56) References Cited

U.S. PATENT DOCUMENTS

| | | | |
|---|---|---|---|
| 7,672,055 | B2 | 3/2010 | Amitai |
| 8,189,263 | B1 | 5/2012 | Wang et al. |
| 8,432,614 | B2 | 4/2013 | Amitai |
| 8,848,289 | B2 | 9/2014 | Amirparviz et al. |
| 9,977,248 | B1 | 5/2018 | Xie |
| 10,007,115 | B2 | 6/2018 | Greenhalgh et al. |
| 10,754,145 | B1* | 8/2020 | Ouderkirk .............. G02B 7/023 |
| 2010/0149073 | A1 | 6/2010 | Chaum et al. |
| 2013/0250430 | A1 | 9/2013 | Robbins et al. |
| 2014/0104665 | A1 | 4/2014 | Popovich et al. |
| 2014/0300966 | A1 | 10/2014 | Travers et al. |
| 2015/0234188 | A1 | 8/2015 | Lee |
| 2017/0171533 | A1* | 6/2017 | Benitez .............. G02B 27/0012 |
| 2017/0184848 | A1 | 6/2017 | Vallius |
| 2017/0299877 | A1 | 10/2017 | Huang |
| 2018/0067315 | A1 | 3/2018 | Amitai et al. |
| 2020/0326545 | A1* | 10/2020 | Amitai ................. G02B 6/0031 |
| 2021/0199975 | A1* | 7/2021 | Matsumoto ........ G02B 27/0172 |

FOREIGN PATENT DOCUMENTS

| | | |
|---|---|---|
| CN | 104145208 | 11/2014 |
| CN | 105934902 | 9/2016 |
| CN | 107193126 | 9/2017 |
| CN | 107272210 | 10/2017 |
| CN | 107329273 | 11/2017 |
| CN | 107436489 | 12/2017 |
| CN | 107561702 | 1/2018 |
| CN | 108051917 | 5/2018 |
| CN | 108227203 | 6/2018 |
| CN | 108333750 | 7/2018 |
| JP | 6123342 | 5/2017 |
| WO | 2016103251 | 6/2016 |
| WO | 2016149416 | 9/2016 |

OTHER PUBLICATIONS

"Search Report of Europe Counterpart Application", dated Mar. 25, 2020, p. 1-p. 17.

"Search Report of Europe Counterpart Application", dated Jul. 27, 2020, pp. 1-18.

"Office Action of China Counterpart Application", dated Oct. 15, 2021, p. 1-p. 9.

* cited by examiner

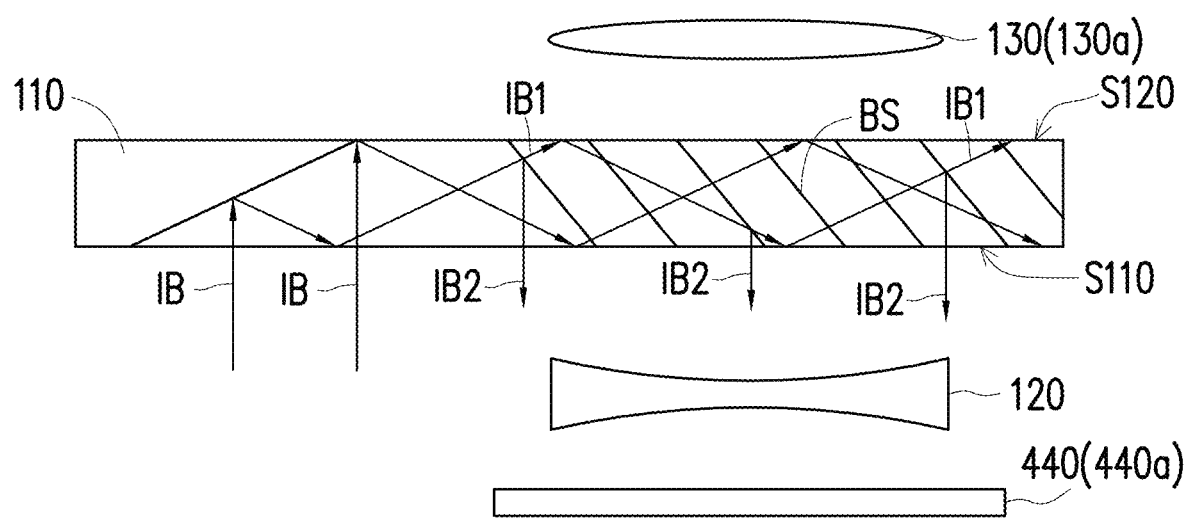
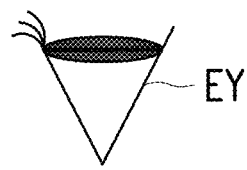
FIG. 4A

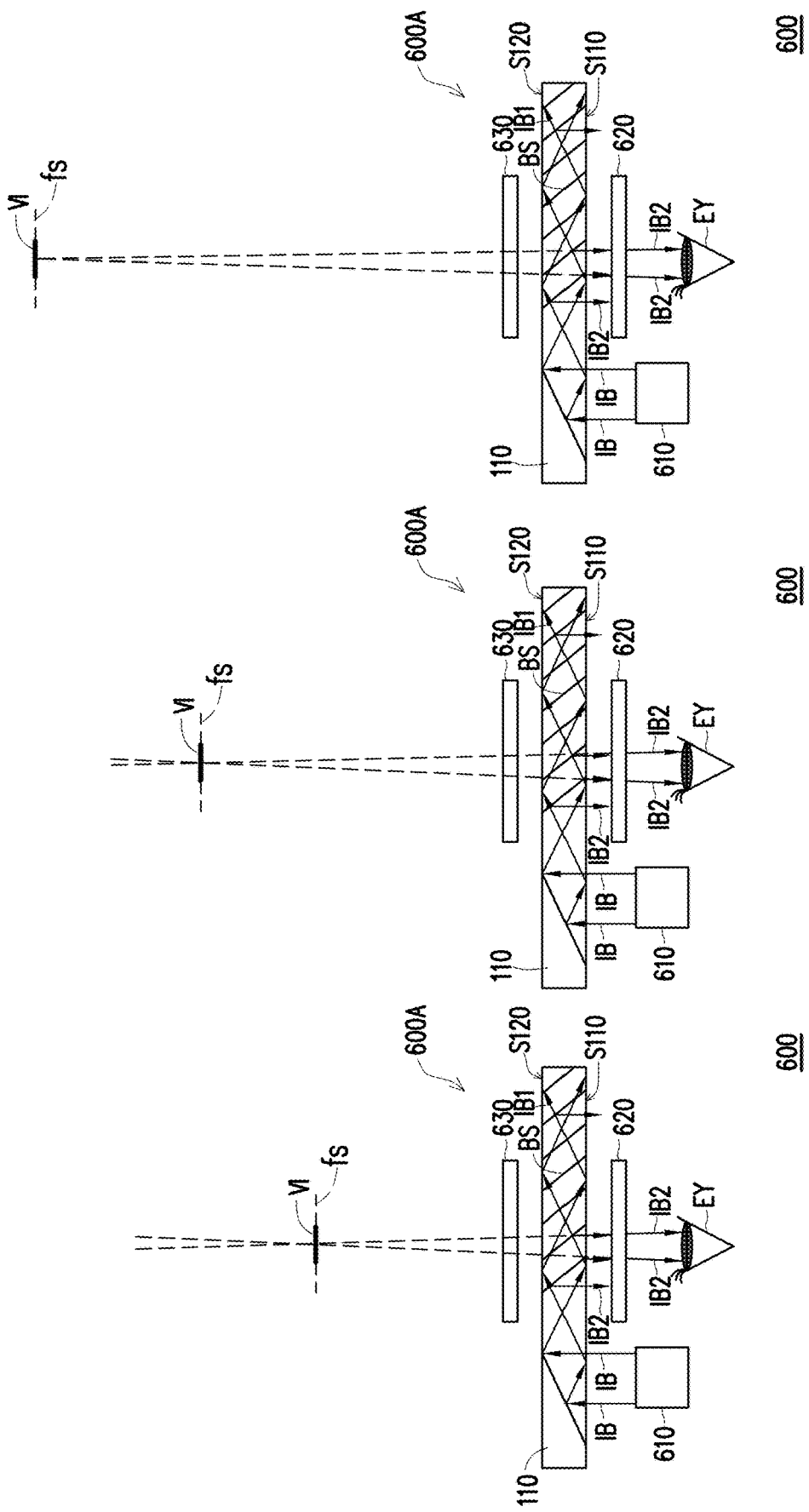

OPTICAL TRANSMITTING MODULE AND HEAD MOUNTED DISPLAY DEVICE

CROSS-REFERENCE TO RELATED APPLICATION

This application claims the priority benefit of China application serial no. 201811213344.5, filed on Oct. 18, 2018. The entirety of the above-mentioned patent application is hereby incorporated by reference herein and made a part of this specification.

BACKGROUND OF THE INVENTION

Field of the Invention

The invention relates to an optical module and a display device, and more particularly, relates to an optical transmitting module and a head mounted display device.

Description of Related Art

With the advancement of display technology and people's desire for high technology, virtual reality and augmented reality technology has gradually matured. A head mounted display (HMD) device is a display for realizing this technology. Development history of the head mounted display can trace back to the US military in the 1970s where an optical projection system is used to project images or textual information from a display element to the user's eyes. In recent years, with higher resolution and lower power consumption in a micro display, the head mounted display has been developed into a portable display device. In addition to the military field, the display technology of head-mounted displays has also grown and occupied an important position in other fields related to industrial production, simulation training, stereo display, medical, sports, navigation and video games.

Currently, there is a head mounted display device that utilizes a waveguide as an optical component (combiner). This head mounted display device using the waveguide can have a thinner thickness (approximately 1.5 mm) and can magnify a range of the eye box or so-called exit pupil by utilizing the mechanism of copying the output pupil, so as to allow the human eyes to still see the full image when there is a large displacement.

However, because this head mounted display device has multiple output pupils, the human eyes would see a ghost image when the light at the same angle or the same image information is projected from two or more adjacent output pupils to the eye pupils. Therefore, clear imaging locations of virtual images displayed by this head mounted display device are preset to infinity or in a location far enough to make the dimension of the displayed virtual images far greater than a misalignment of the same image information so the ghost image phenomenon cannot be easily observed. Nonetheless, in environments (e.g., in stereoscopic image display mode or interactive mode, etc.) with the demand for a close-range image display (e.g., in the clear sight distance of the human eye, i.e., a distance range of 25 mm to 3 m), the ghost image phenomenon can be easily observed by the human eyes and is thus not conducive for use.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides an optical transmitting module capable of eliminating a ghost image that occurs when the user observes images displayed in a range closer to the eye.

The invention provides a head mounted display device capable of eliminating a ghost image that occurs when the user observes images displayed in a range closer to the eye.

Other objects and advantages of the invention can be further illustrated by the technical features broadly embodied and described as follows.

To achieve one, a part, or all of the above objectives or other objectives, an embodiment of the invention proposes an optical transmitting module, which is configured to transmit an image beam to at least one eye of a user. The optical transmitting module includes a waveguide and a first lens. The waveguide is located on a transmission path of an image beam. The waveguide includes a first side and a second side opposite to each other. The waveguide includes a plurality of beam splitters, and the beam splitters are disposed between the first side and the second side. Each beam splitter is configured to receive the image beam and split the image beam into a first image beam and a second image beam. The first image beam is transmitted to another beam splitter after passing through one beam splitter. The second image beam is outputted from the first side of the waveguide after being reflected by the beam splitter, and is transmitted to the at least one eye of the user, so as to display a virtual image. The first lens has a negative refracting power. The first lens is disposed between the first side of the waveguide and the at least one eye of the user, located on a transmission path of the second image beam, and configured to cause the plurality of virtual images displayed by the plurality of the second image beams reflected from the different beam splitters of the waveguide at the same angle to coincide on a focal plane of the first lens.

To achieve one, a part, or all of the objects or other objects, an embodiment of the invention proposes a head mounted display device. The head mounted display device is configured to be disposed in front of at least one eye of a user, and includes a display module and the optical transmitting module described above. The display module is configured to transmit an image beam, and the optical transmitting module is configured to transmit the image beam to the at least one eye of the user.

Based on the above, the embodiments of the invention have at least one of the following advantages and effects. In the embodiments of the invention, with configuration of the first lens, the optical transmitting module and the head mounted display device can cause the virtual images displayed by the second image beams reflected outside the waveguide from the different beam splitters of the waveguide at the same angle to coincide on the focal plane of the first lens. As such, the ghost image phenomenon that occurs when the user observes the images displayed in a range closer to the eye may be eliminated, and a display quality of the head mounted display device and a comfort of the user may also be improved.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A and FIG. 4B are schematic structure diagrams of various optical transmitting modules in an embodiment of the invention.

FIG. 6A to FIG. 6C are schematic structure diagrams of optical paths of virtual images displayed by another head mounted display device at different times in an embodiment of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
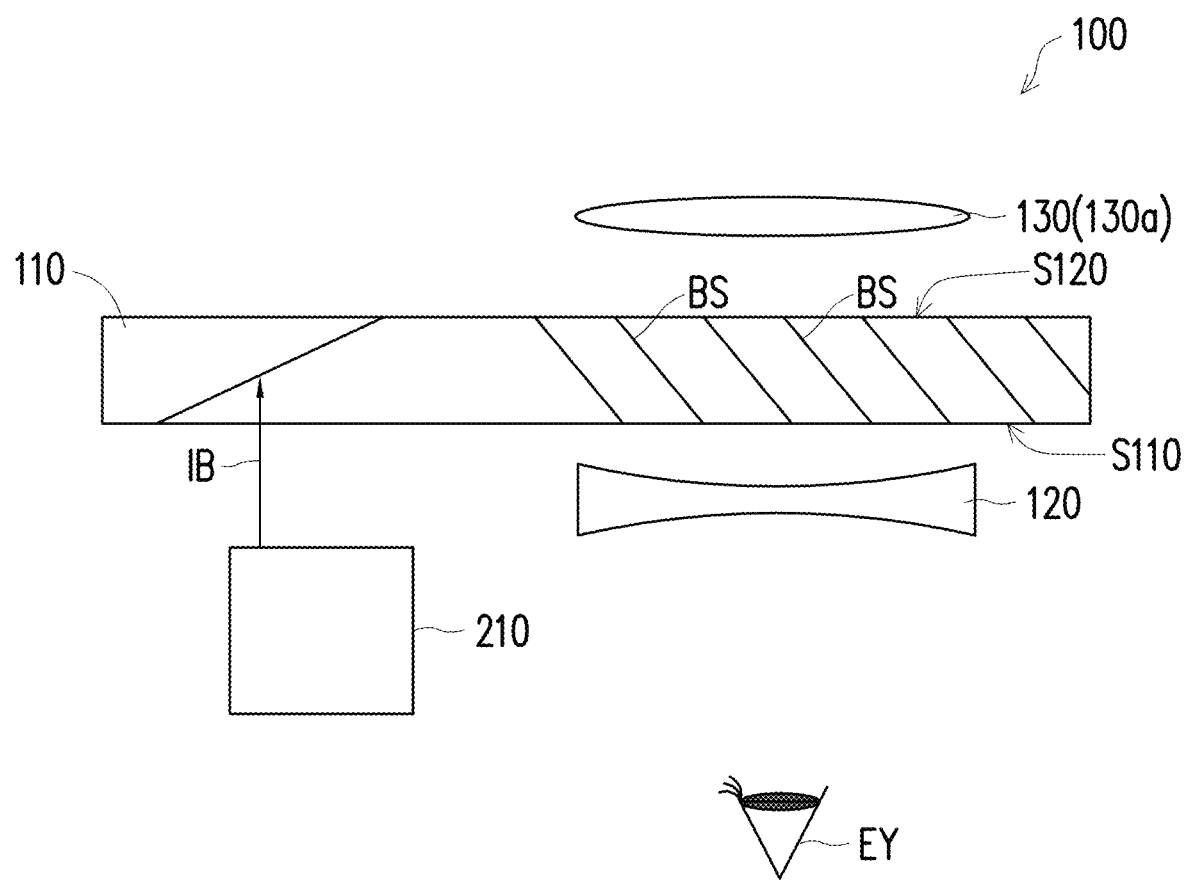
FIG. 1 is a schematic structure diagram of a head mounted display device in an embodiment of the invention.

FIG. 1 is a schematic structure diagram of a head mounted display device in an embodiment of the invention. With reference to FIG. 1, in this embodiment, a head mounted display device 200 is adapted to be disposed in front of at least one eye EY of a user. The head mounted display device 200 includes a display module 210 and an optical transmitting module 100. The display module 210 is adapted to transmit an image beam IB, and the optical transmitting module 100 is configured to transmit the image beam IB to the at least one eye EY of the user. For instance, in this embodiment, the display module 210 may be a light field display, and may be a projection-type light field display. The display module 210 may include optical elements (not illustrated) such as a collimation light source, a lens, a lens array, a display element. Here, a light beam emitted by the collimation light source is incident to the display element after sequentially passing through the lens and the lens array, and the display element is configured to convert the light beam into the image beam IB with depth information. However, the invention is not limited in this regard. In this way, the image beam IB provided by the display module 210 can have current light field information, achieve an effect of focusing afterwards, and accordingly provide the image information in depth.

Specifically, as shown by FIG. 1, in this embodiment, the optical transmitting module 100 includes a waveguide 110, a first lens 120 and an optical element 130. The waveguide 110 is located on a transmission path of the image beam IB. The waveguide 110 includes a first side S110 and a second side S120 opposite to each other. The waveguide 110 includes a plurality of beam splitters BS, and the beam splitters BS are disposed between the first side S110 and the second side S120. For instance, as shown by FIG. 1, in this embodiment, each of the beam splitters BS has the same included angle with respect to the first side S110 and the beam splitters BS are disposed at equal distances. On the other hand, as shown by FIG. 1, in this embodiment, the first lens 120 has a negative refracting power and is disposed between the first side S110 of the waveguide 110 and the at least one eye EY of the user, and the waveguide 110 is located between the optical element 130 and the first lens 120.

The process regarding how the optical transmitting module 100 of the head mounted display device 200 eliminates the ghost image phenomenon that occurs when the user observes the images displayed in a range closer to the eye, is described below with reference to FIG. 2 to FIG. 3B.

Figure 2:
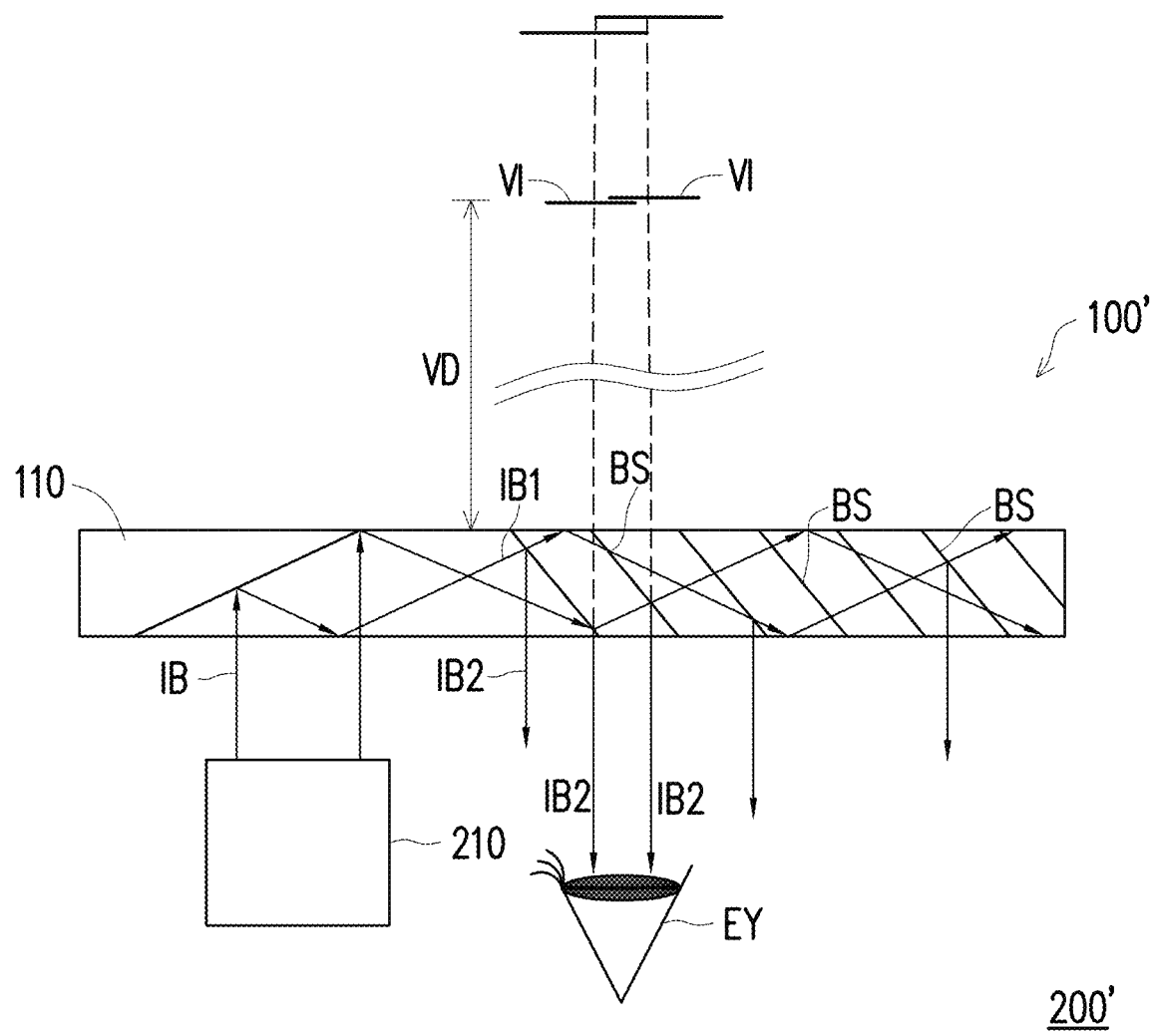
FIG. 2 is a schematic diagram of optical paths of a virtual image displayed by a head mounted display device in a comparative example of the invention.
Figure 3A:
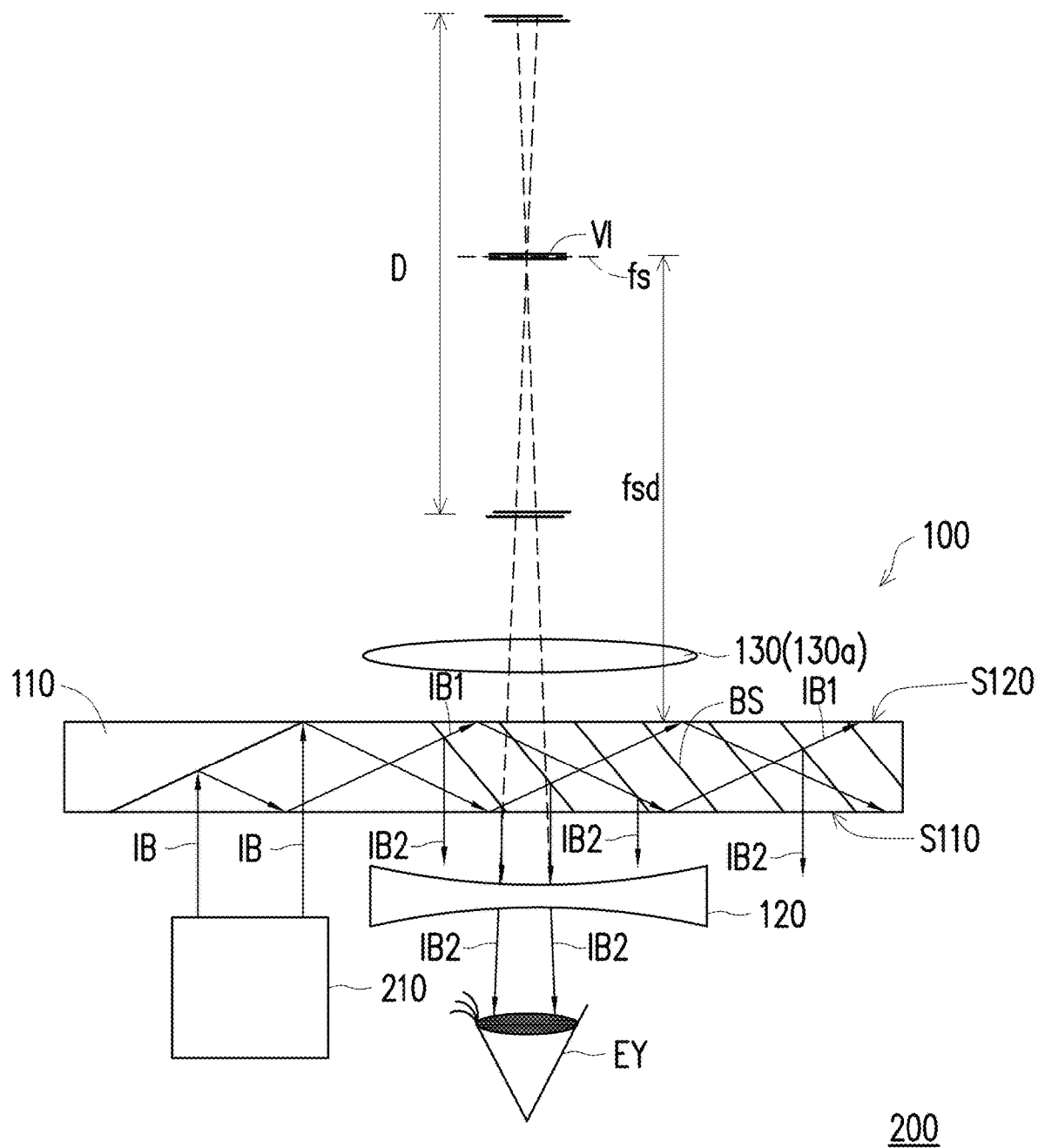
FIG. 3A is a schematic diagram of a virtual image displayed by the optical transmitting module of FIG. 1.

FIG. 2 is a schematic diagram of optical paths of a virtual image displayed by a head mounted display device in a comparative example of the invention. FIG. 3A is a schematic diagram of a virtual image displayed by the optical transmitting module of FIG. 1. FIG. 3B is a schematic diagram of a real image displayed by the optical transmitting module of FIG. 1. With reference to FIG. 2, a head mounted display device 200' in the comparative example is similar to the head mounted display device 200 of FIG. 1 and the difference between the two is described as follows. In the comparative example of FIG. 2, an optical transmitting module 100' of the head mounted display device 200' does not include the first lens 120 and the optical element 130 but only includes the waveguide 110.

Specifically, as shown by FIG. 2 and FIG. 3A, in the comparative example and the embodiment of FIG. 3A, interfaces of the beam splitters BS included by the waveguide 110 have interfaces with partial refraction and partial reflection functions. Therefore, when the image beam IB emitted by the display module 210 is incident into the waveguide 110 from the first side S110 of the waveguide 110 and the image beam IB transmitting in the waveguide 110 passes through the interfaces of the beam splitters BS, a first image beam IB1 is formed by the refraction function of the interface of the corresponding beam splitter BS and a second image beam IB2 is formed by the reflection function of the interface of the corresponding beam splitter BS. In other words, each of the beam splitters BS is adapted to receive the image beam IB and split the image beam IB into the first image beam IB1 and the second image beam IB2. Further, the first image beam IB1 and the second image beam IB2 both record with the light field information of the image beam IB.

More specifically, as shown by FIG. 2 and FIG. 3A, in the comparative example and the embodiment of FIG. 3A, the image beam IB is first transmitted in the waveguide 110 in total reflection. Further, in an example where the image beam IB just starts to pass through the interface of one of the beam splitters BS of the waveguide 110, the first image beam IB1 and the second image beam IB2 are formed when the image beam IB is incident on said one of the beam splitters BS. Also, the first image beam IB1 formed by said one of the beam splitters BS is transmitted to another one of the beam splitters BS after passing through said one of the beam splitters BS, and the second image beam IB2 reflected by said one of the beam splitters BS is outputted from the first side S110 of the waveguide 110. Furthermore, because the first image beam IB1 also carries the same complete image information as the image beam IB, the first image beam IB1 can also cause said another one of the beam splitters BS to similarly generate the first image beam IB1 transmitting in the waveguide 110 and the second image beam IB2 outputted from the waveguide 110 after being reflected by the beam splitter BS. The subsequent light beams all have the transmission manner as described above. On the other hand, because the second image beam IB2 which is outputted from the waveguide 110 after being reflected by each of the beam splitters BS has the same complete image information as the image beam IB, when the second beams IB2 formed by the beam splitters BS are transmitted to the least one eye EY of the user, virtual images VI should be displayed and combined into a complete and clear image at a preset distance.

Figure 7B:
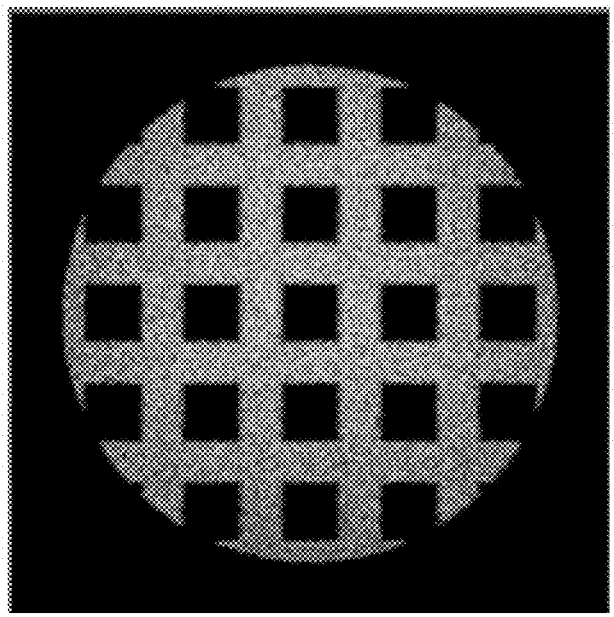
FIG. 7B is a schematic diagram of the virtual image not having the ghost image phenomenon formed by the head mounted display device of FIG. 3A.
Figure 7A:
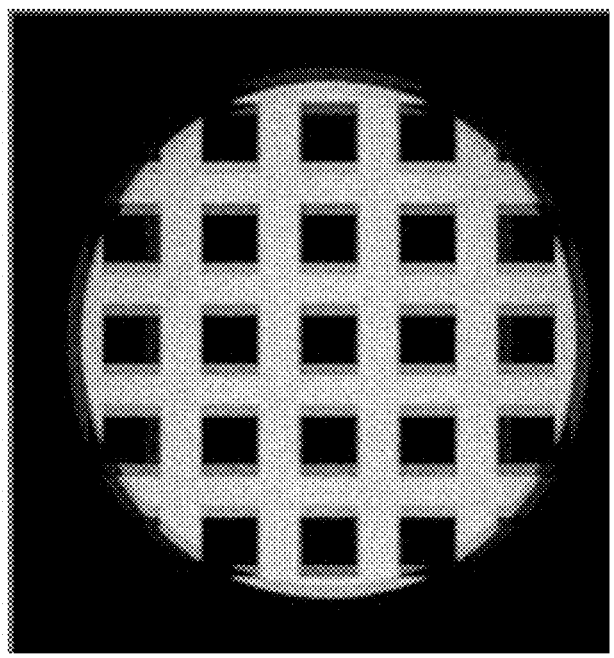
FIG. 7A is a schematic diagram of the virtual image having the ghost image phenomenon formed by the head mounted display device of FIG. 2.

However, because the second image beam IB2 formed by each of the beam splitters BS is outputted from the waveguide 110 at a diverging angle, the image information received by the at least one eye EY of the user is provided by the second image beams IB2 formed through the different beam splitters BS. In this case, as shown by FIG. 2, in the comparative example of FIG. 2, when the second image beams IB2 are projected into the pupil of the eye EY from the different beam splitters BS (e.g., two or more adjacent beam splitters BS) of the waveguide 110 of the optical transmitting module 100' at the same angle, the human eye will see a ghost image at a location in less than the preset distance. FIG. 7A is a schematic diagram of the virtual image having the ghost image phenomenon formed by the head mounted display device 200' of FIG. 2. As shown by FIG. 7A, the human eye will see a blurred image. A width of such ghost image depends on an interval between two adjacent beam splitters BS. Therefore, a distance between an imaging location of the virtual image VI displayed by the head mounted display device 200' and the waveguide 110 is a first distance VD. If clear imaging locations of the virtual images VI are preset to infinity or in a location far enough to make the dimension of the displayed virtual image VI far greater than the misalignment of the same image information, the ghost image phenomenon cannot be easily observed. However, the first distance VD is located closer to the waveguide 110, therefore, the ghost image phenomenon would occur when the human eye sees the virtual images VI in the first distance VD. Consequently, the head mounted display device 200' is not conducive to meet the demand for the image displayed in a range closer to the eye of the user.

In contrast, as shown in FIG. 3A, in the embodiment of FIG. 3A, because the first lens 120 of the optical transmitting module 100 of the head mounted display device 200 has the negative refracting power and is located on a transmission path of the second image beams IB2, when the second image beams IB2 are projected towards the pupil of the eye EY from the different beam splitters BS (e.g., two or more adjacent beam splitters BS) of the waveguide 110 at the same angle, the virtual images VI displayed by the second image beams IB2 can coincide on a focal plane fs of the first lens 120. FIG. 7B is a schematic diagram of the virtual image not having the ghost image phenomenon formed by the head mounted display device 200 of FIG. 3. As shown by FIG. 7B, the human eye will see a clearer image. A distance from the focal plane fs of the first lens 120 to the waveguide 130 is a second distance fsd. That is to say, by disposing the first lens 120 having the negative refracting power in the optical transmitting module 100, the first distance VD in which the virtual images VI are originally generated by the optical transmitting module 100' in FIG. 2 may be adjusted into the second distance fsd of FIG. 3A, wherein the second distance fsd is less than the first distance VD. Further, as shown by FIG. 3A, in the embodiment of FIG. 3A, within a fixed distance D related to the focal plane fs and served as a location range, although the displayed virtual images VI still show a minor misalignment, such dislocation is acceptable to the human eye so the ghost image phenomenon cannot be easily detected. In this embodiment, each of the first distance VD or the second distance fsd is, for example, a linear distance of the virtual image VI displayed by each of the second image beams IB2 relative to the second side S120 of the waveguide 110.

For instance, in the embodiment of FIG. 3A, a distance of the focal plane fs of the first lens 120 relative to the at least one eye EY of the user is in a range of 25 cm to 3 m. In other words, in this embodiment, a distance of the virtual image VI displayed by each of the second image beams IB2 relative to the at least one eye EY of the user can also fall in the range of 25 cm to 3 m to be conducive to meet the demand for the image displayed in the range closer to the eye of the user. Here, the distances from the focal plane fs of the first lens 120 and each virtual image VI displayed by each of the second image beams IB2 relative to the at least one eye EY of the user refer to linear distances from the focal plane fs of the first lens 120 and each virtual image VI displayed by each of the second image beams IB2 relative to the at least one eye EY of the user.

Figure 3B:
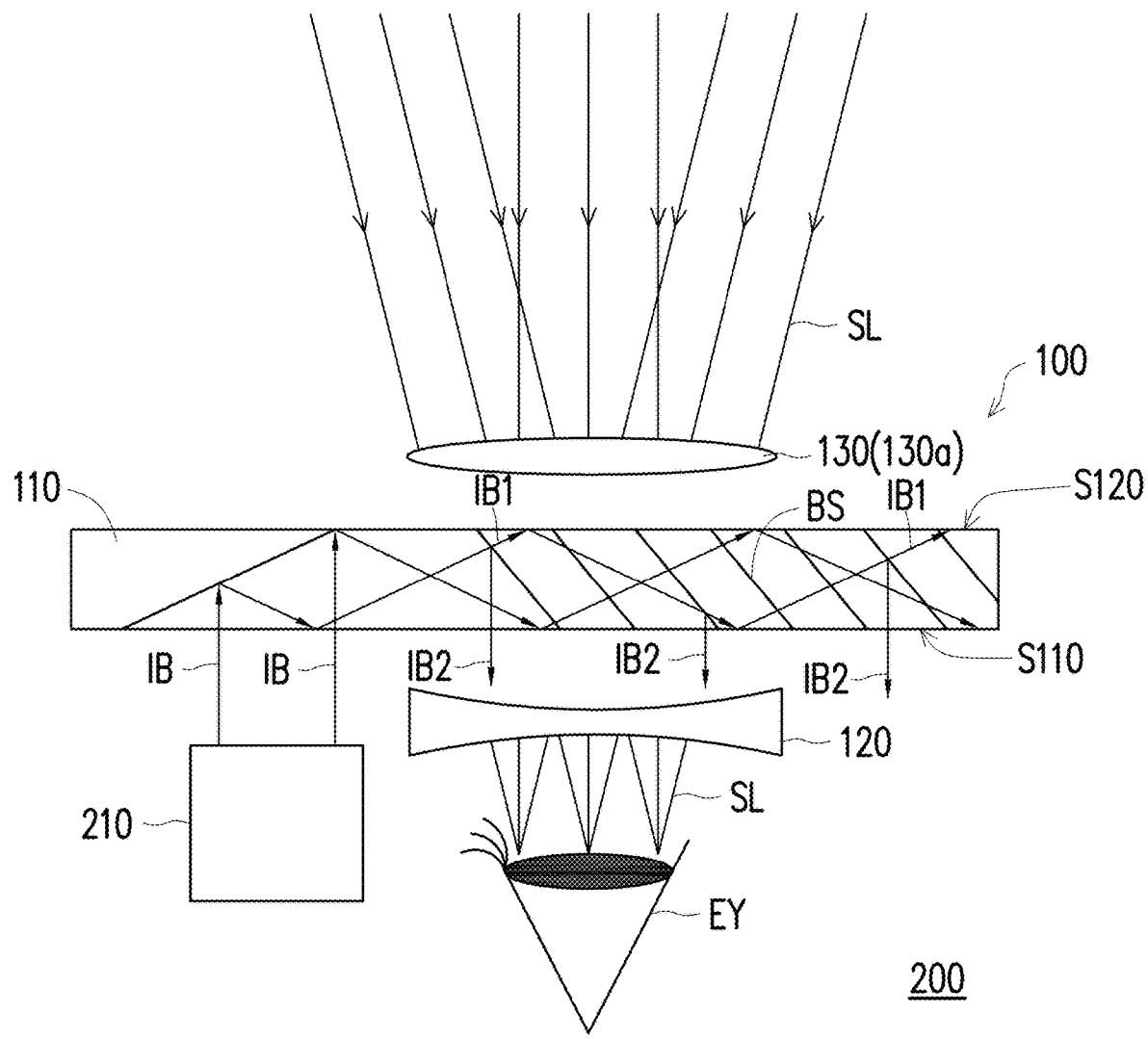
FIG. 3B is a schematic diagram of a real image displayed by the optical transmitting module of FIG. 1.

Moreover, as shown by FIG. 1 and FIG. 3B, in this embodiment, the optical element 130 of the optical transmitting module 100 is a second lens 130a. The second lens 130a has a positive refracting power, and a magnitude of the refractive power of the first lens 120 is the same value as a magnitude of the refractive power of the second lens 130a. Specifically, as shown by FIG. 3B, in this embodiment, an ambient light SL from the outside is transmitted to the at least one eye EY of the user after sequentially passing through the second lens 130a (the optical element 130), the waveguide 110 and the first lens 120, so as to display a real image. In this way, with configuration of the second lens 130a (the optical element 130), the real image formed according to the ambient light SL can avoid distortion caused by configuration of the first lens 120.

Accordingly, with configuration of the first lens 120, the optical transmitting module 100 and the head mounted display device 200 can cause the virtual images VI displayed by the second image beams IB2 reflected from the different beam splitters BS of the waveguide 110 at the same angle to coincide on the focal plane fs of the first lens 120. As such, the ghost image phenomenon that occurs when the user observes the images displayed in a range closer to the eye may be eliminated, and a display quality of the head mounted display device 200 and a comfort of the user may also be improved. Also, in the eyes of the user, with configuration of the optical element 130 and the first lens 120 at the same time, the real image formed according to the ambient light SL can still avoid distortion.

Figure 4B:
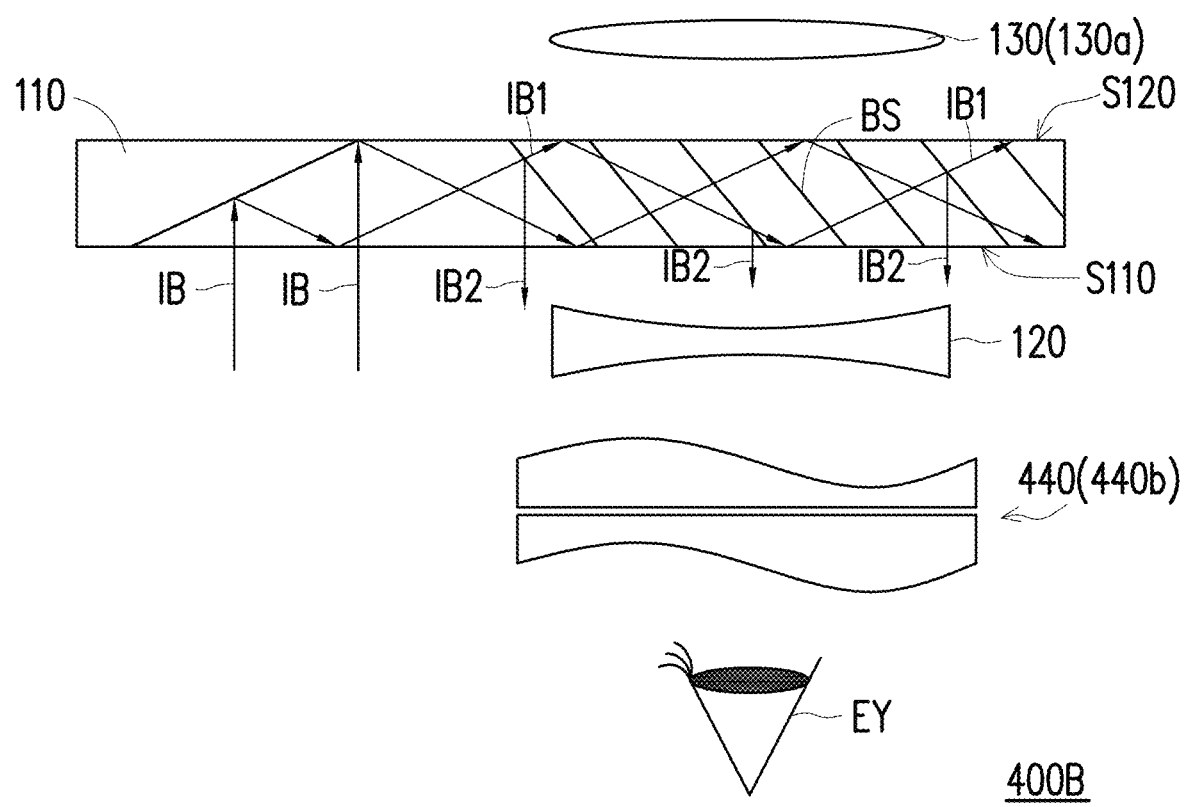

FIG. 4A and FIG. 4B are schematic structure diagrams of various optical transmitting modules in an embodiment of the invention. With reference to FIG. 4A and FIG. 4B, optical transmitting modules 400A and 400B in the embodiments of FIG. 4A and FIG. 4B are similar to the optical transmitting module 100 of FIG. 1, and their difference is described as follows. As shown by FIG. 4A and FIG. 4B, each of the optical transmitting modules 400A and 400B further includes a third lens 440, which is located on the transmission path of each of the second image beams IB2. Specifically, in the embodiments of FIG. 4A and FIG. 4B, the third lens 440 is a variable focus lens adapted to adjust distances of each of the virtual images VI displayed by each of the second image beams IB2 and the real image formed according to the ambient light SL relative to the at least one eye EY of the user. For instance, in the embodiment of FIG. 4A, the third lens 440 may be a liquid crystal lens 440a (LC lens). In the embodiment of FIG. 4B, the third lens 440 is an Alvarez lens 440b, which is a lens element with two separate lenses that can control the refracting power of the lens element by adjusting a misalignment of the two separate lenses.

Accordingly, in the embodiments of FIG. 4A and FIG. 4B, with configuration of the third lens 440, both the optical transmitting modules 400A and 400B can adjust the distances of the virtual images VI formed according to the image beams IB and the real image formed according to the ambient light SL relative to the at least one eye EY of the user. In this way, a human eyesight correction effect may be provided, so that the user with nearsightedness or farsightedness can clearly see the displayed image and can clearly observe the view in front the eye EY without additionally wearing glasses.

In addition, because the optical transmitting modules 400A and 400B of FIG. 4A and FIG. 4B have the same configuration of the first lens 120 and the optical element 130 as the optical transmitting module 100 of FIG. 1 to achieve the same functions, the optical transmitting modules 400A and 400B can also achieve similar effects and advantages of the optical transmitting module 100 described above, which are not repeated hereinafter. Also, when the optical transmitting module 400A (or 400B) is applied to the head mounted display device 200, the head mounted display device 200 may also achieve similar effects and advantages, which are not repeated hereinafter.

In the foregoing embodiments, the first lens 120 applied in the optical transmitting modules 100, 400A and 400B is exemplified by using the lens element having the negative refracting power, but the invention is not limited thereto. In other embodiments, the first lens 120 may also be other types of the lens elements, and similar effects can still be achieved. Further description is provided below with reference to FIG. 5.

Figure 5:
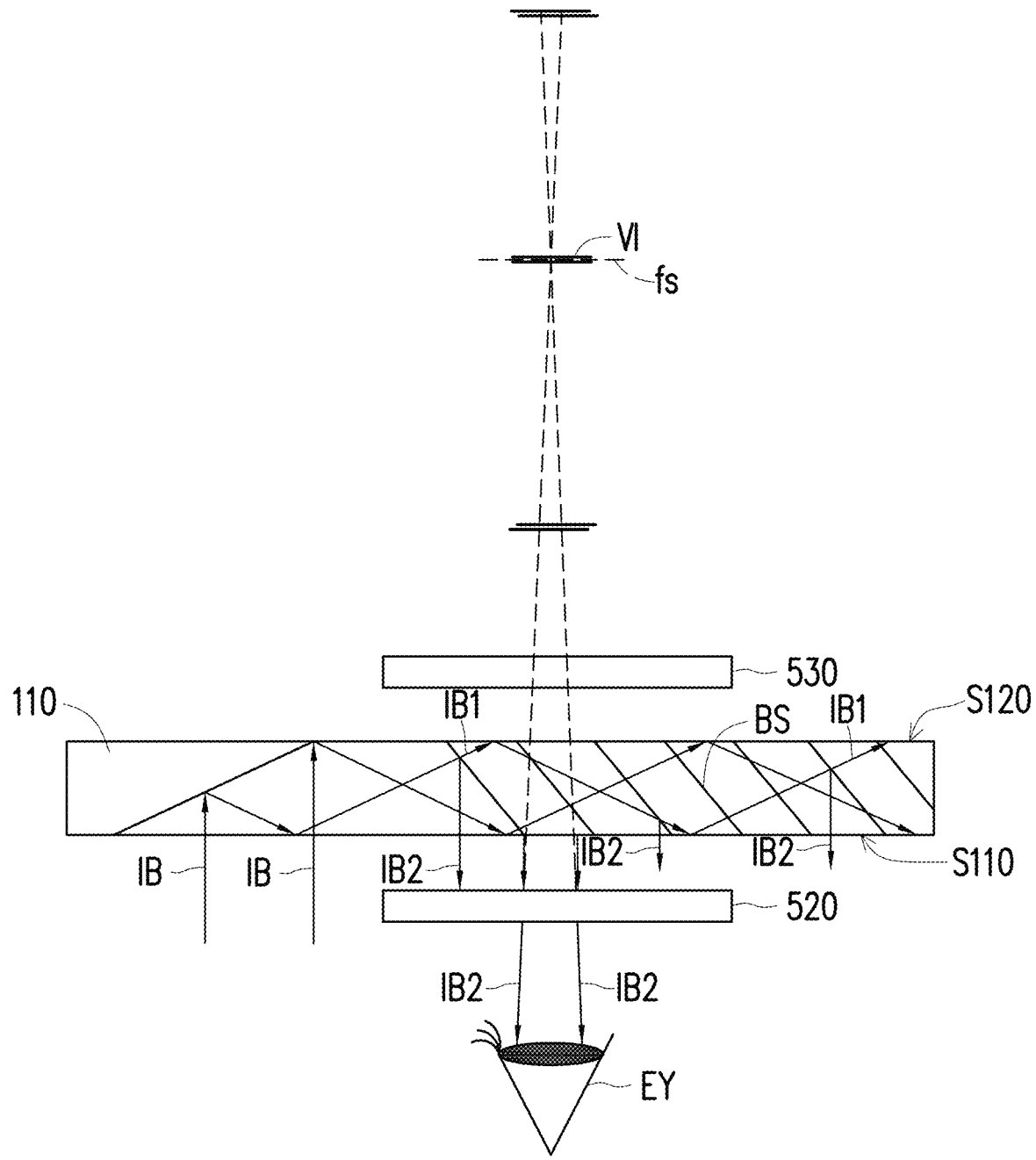
FIG. 5 is schematic structure diagram of another optical transmitting module in an embodiment of the invention.

FIG. 5 is schematic structure diagram of another optical transmitting module in an embodiment of the invention. With reference to FIG. 5, an optical transmitting module 500 of the embodiment is similar to the optical transmitting module 100 of FIG. 1, and the difference between the two modules is described as follows. For instance, as shown by FIG. 5, in this embodiment, a first lens 520 of the optical transmitting module 500 may be a liquid crystal lens, a Fresnel lens, a diffraction lens or a phase lens. In other words, in this embodiment, the first lens 520 may have a phase dependency (i.e., adapted to modulate a light ray having a specific polarization state) or have a wavelength dependency (i.e., adapted to modulate a light ray in a specific wave band range).

Specifically, in this embodiment, the first lens 520 still has the negative refracting power, but a magnitude of the refractive power may be adjusted as needed. In this case, an optical element 530 of the optical transmitting module 500 may be a liquid crystal lens, a Fresnel lens, a diffraction lens or a phase lens having a positive refracting power (the second lens), and a magnitude of the refracting power of the first lens 520 and a magnitude of the refracting power of the optical element 530 (the second lens) are of the same value. In this way, the virtual images VI formed according to the image beam IB can avoid the ghost image phenomenon that possibly occurs when the user observes the images displayed in a range closer to the eye with configuration of the first lens 520, and the real image formed according to the ambient light SL can avoid distortion caused by the first lens 520 with configuration of the optical element 530.

On the other hand, in this embodiment, when the first lens 520 has the phase dependency adapted to modulate the light having the specific polarization state, the image beam IB entering the optical transmitting module 500 has the specific polarization state to be adapted to coincide on the focal plane fs of the first lens 520 through the waveguide 110 and the first lens 520. The optical element 530 in this case may simply be a polarizer adapted to filter the light ray having the specific polarization state. In this way, the light having the specific polarization state in the ambient light SL may be filtered by the optical element 530, whereas the remaining part of the ambient light SL is transmitted to the at least one eye EY of the user without being affected by the first lens 520. Accordingly, the virtual images VI formed according to the image beam IB can avoid the ghost image phenomenon that possibly occurs when the user observes the images displayed in a range closer to the eye with configuration of the first lens 520, and the real image formed according to the ambient light SL can avoid distortion caused by the first lens 520 with configuration of the optical element 530.

In this embodiment, when the first lens 520 has the wavelength dependency adapted to modulate the light in the specific wave band range, a wavelength range of the image beam IB entering the optical transmitting module 500 falls in the specific wave band range to be adapted to coincide on the focal plane fs of the first lens 520 through the waveguide 110 and the first lens 520. The optical element 530 in this case may simply be a filter adapted to filter the light in the specific wave band range. In this way, the light having the specific wave band range in the ambient light SL may be filtered by the optical element 530, whereas the remaining part of the ambient light SL is transmitted to the at least one eye EY of the user without being affected by the first lens 520. For instance, the image beam IB in this case may be, preferably, provided by a laser source to include a narrower wave band range and selectively narrow down the specific wave band range to be filtered by the optical element 530. Accordingly, the virtual images VI formed according to the image beam IB can avoid the ghost image phenomenon that possibly occurs when the user observes the images displayed in a range closer to the eye with configuration of the first lens 520, and the real image formed according to the ambient light ray SL can avoid distortion caused by the first lens 520 with configuration of the optical element 530.

In addition, because the optical transmitting module 500 of FIG. 5 is similar to the optical transmitting module 100 of FIG. 1 to achieve the same functions, the optical transmitting module 500 can also achieve similar effects and advantages of the optical transmitting module 100 described above, which are not repeated hereinafter. Also, when the optical transmitting module 500 is applied to the head mounted display device 200, the head mounted display device 200 may also achieve similar effects and advantages, which are not repeated hereinafter.

FIG. 6A to FIG. 6C are schematic structure diagrams of optical paths of virtual images VI displayed by another head mounted display device 600 at different times in an embodiment of the invention. With reference to FIG. 6A to FIG. 6C, a head mounted display device 600 in the embodiments of FIG. 6A to FIG. 6C is similar to the head mounted display device 200 of FIG. 1 and the difference between the two devices is described as follows. For instance, as shown by FIG. 6A to FIG. 6C, in this embodiment, a display module 610 is a time-multiplexing display module. Further, a first lens 620 and an optical element 630 of an optical transmitting module 600A of the head mounted display device 600 are variable focus lens structure which can include variable focus lens elements such as the LC lens. In other words, in this embodiment, the head mounted display device 600 is a time-multiplexing display device. Further, in this embodiment, the head mounted display device 600 further includes an eyeball detecting device (no illustrated), which is adapted to detect a focus position of the at least one eye EY of the user.

Accordingly, as shown by FIG. 6A to FIG. 6C, in this embodiment, because the display module 610 provides the image beam IB having different depths in a time-multiplexing manner, the head mounted display device 600 can simultaneously detect the focus position of the at least eye EY of the user through the eyeball detect device. Also, in this embodiment, the focal plane fs of the first lens 620 is adapted to move in correspondence to a focal point of the at least one eye EY of the user in a direction. In FIG. 6A to FIG. 6C, a distance of the focal plane fs of the first lens 620 relative to the at least one eye EY of the user may be correspondingly modulated from near to far according to the focal point of the at least one eye EY of the user such that the distance of each virtual image VI displayed by each of the second image beams IB2 relative to the at least one eye EY of the user may also be correspondingly changed. In this way, as shown by FIG. 6A to DIG. 6C, the first lens 620 and the optical element 630 of the head mounted display device 600 can modulate the image beam IB in the time-multiplexing manner, so as to eliminate the ghost image phenomenon at different depth locations where the virtual images VI displayed by the modulated image beam IB are to be imaged.

In addition, because the optical transmitting module 600A of the head mounted display device 600 of FIG. 6A to FIG. 6C also includes the first lens 620 having the negative refracting power and the optical element 630 having the positive refracting power, the head mounted display device 600 of FIG. 6A to FIG. 6C can also achieve similar effects and advantages when the optical transmitting module 500 of FIG. 5 is applied to the head mounted display device, which are not repeated hereinafter.

In summary, the embodiments of the invention have at least one of the following advantages and effects. In the embodiments of the invention, with configuration of the first lens, the optical transmitting module and the head mounted display device can cause the virtual images displayed by the second image beams reflected from the different beam splitters disposed in the waveguide at the same angle to coincide on the focal plane of the first lens. As such, the ghost image phenomenon that occurs when the user observes the images displayed in a range closer to the eye may be eliminated, and a display quality of the head mounted display device and a comfort of the user may also be improved. Also, in the eyes of the user, with configuration of the optical element and the first lens at the same time, the real image formed according to the ambient light ray can avoid distortion.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical transmitting module for transmitting an image beam to at least one eye of a user, comprising: a waveguide and a first lens, wherein the waveguide is located on a transmission path of the image beam, wherein the waveguide comprises a first side and a second side opposite to each other, the waveguide comprising a plurality of beam splitters, the beam splitters being disposed between the first side and the second side, each of the beam splitters being configured to receive the image beam and split the image beam into a first image beam and a second image beam, the first image beam being transmitted to another one of the beam splitters after passing through one of the beam splitters, the second image beam being outputted from the first side of the waveguide after being reflected by said one of the beam splitters, the second image beam being transmitted to the at least one eye of the user, so as to display a virtual image; and the first lens having a negative refracting power, the first lens being disposed between the first side of the waveguide and the at least one eye of the user, located on a transmission path of the second image beam, and configured to cause a plurality of the virtual images displayed by a plurality of the second image beams reflected from the different beam splitters of the waveguide at the same angle to coincide on a focal plane of the first lens, wherein the optical transmitting module further comprises:

an optical element, the waveguide being located between the optical element and the first lens, wherein an ambient light is transmitted to the at least one eye of the user after sequentially passing through the optical element, the waveguide and the first lens, so as to display a real image, wherein the optical element is a second lens, the second lens has a positive refracting power, and a magnitude of the refractive power of the first lens is identical to a magnitude of the refractive mower of the second lens.

2. The optical transmitting module according to claim 1, wherein a distance of the focal plane of the first lens relative to the at least one eye of the user is in a range of 25 cm to 3 m.

3. The optical transmitting module according to claim 1, wherein the first lens and the second lens are both variable focus lenses, and the focal plane of the first lens is configured to move in correspondence to a focal point of the at least one eye of the user in a direction.

4. The optical transmitting module according to claim 1, wherein the first lens and the second lens comprises a liquid crystal lens, a Fresnel lens, a diffraction lens or a phase lens.

5. The optical transmitting module according to claim 4, wherein the first lens is configured to modulate a light having a specific polarization state, the optical component is a polarizer adapted to filter the light having the specific polarization state, and the image beam has the specific polarization state.

6. The optical transmitting module according to claim 4, wherein the first lens is configured to modulate a light having a specific wave band range, the optical element is a filter configured to filter the light having the specific wave band range, and a wavelength range of the image beam falls in the specific wave band range.

7. The optical transmitting module according to claim 1, further comprising:

a third lens, located on the transmission path of each of the second image beams, wherein the third lens is a variable focus lens configured to adjust a distance of each of the virtual images displayed by each of the second image beams relative to the at least one eye of the user.

8. The optical transmitting module according to claim 1, wherein a distance of each of the virtual images relative to the at least one eye of the user is in a range of 25 cm to 3 m.

9. A head mounted display device, adapted to be disposed in front of at least one eye of a user, comprising: a display module and an optical transmitting module, the optical transmitting module comprising a waveguide and a first lens, wherein the display module is configured to provide an image beam;

the waveguide is located on a transmission path of the image beam, wherein the waveguide comprises a first side and a second side opposite to each other, the waveguide comprising a plurality of beam splitters, the beam splitters being disposed between the first side and the second side, each of the beam splitters being configured to receive the image beam and split the image beam into a first image beam and a second image beam, the first image beam being transmitted to another one of the beam splitters after passing through one of the beam splitters, the second image beam being outputted from the first side of the waveguide after being reflected by said one of the beam splitters, the second image beam being transmitted to the at least one eye of the user, so as to display a virtual image; and the first lens having a negative refracting power, the first lens being disposed between the first side of the waveguide and the at least one eye of the user, located on a transmission path of the second image beam, and configured to cause a plurality of the virtual images displayed by a plurality of the second image beams reflected from the different beam splitters of the waveguide at the same angle to coincide on a focal plane of the first lens, wherein the optical transmitting module further comprises an optical element, the waveguide being located between the optical element and the first lens, wherein an ambient light is transmitted to the at least one eye of the user after sequentially passing through the optical element, the waveguide and the first lens, so as to display a real image, wherein the optical element is a second lens, the second lens has a positive refracting power, and a magnitude of the refractive power of the first lens is identical to a magnitude of the refractive power of the second lens.

10. The head mounted display device according to claim 9, wherein a distance of the focal plane of the first lens relative to the at least one eye of the user is in a range of 25 cm to 3 m.

11. The head mounted display device according to claim 9, wherein the display module is a time-multiplexing display module, the first lens and the second lens are both variable focus lenses, and the focal plane of the first lens is configured to move in correspondence to a focal point of the at least one eye of the user in a direction.

12. The head mounted display device according to claim 9, wherein the first lens and the second lens comprises a liquid crystal lens, a Fresnel lens, a diffraction lens or a phase lens.

13. The head mounted display device according to claim 12, wherein the first lens is configured to modulate a light having a specific polarization state, the optical component is a polarizer configured to filter the light having the specific polarization state, and the image beam has the specific polarization state.

14. The head mounted display device according to claim 12, wherein the first lens is configured to modulate a light having a specific wave band range, the optical element is a filter configured to filter the light having the specific wave band range, and a wavelength range of the image beam falls in the specific wave band range.

15. The head mounted display device according to claim 9, further comprising:
   a third lens, located on the transmission path of each of the second image beams, wherein the third lens is a variable focus lens configured to adjust a distance of each of the virtual images displayed by each of the second image beams relative to the at least one eye of the user.

16. The head mounted display device according to claim 9, wherein a distance of each of the virtual images relative to the at least one eye of the user is in a range of 25 cm to 3 m.

17. The head mounted display device according to claim 9, wherein the display module is a light field display.

* * * * *